United States Patent
Furuskär et al.

(10) Patent No.: US 9,002,398 B2
(45) Date of Patent: Apr. 7, 2015

(54) METHOD AND ARRANGEMENT IN A WIRELESS NETWORK FOR DETERMINING AN UPLINK RECEIVED POWER TARGET VALUE

(75) Inventors: Anders Furuskär, Stockholm (SE); Kimmo Hiltunen, Esbo (FI); Peter Moberg, Stockholm (SE); Arne Simonsson, Gammelstai (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 13/634,572

(22) PCT Filed: Apr. 9, 2010

(86) PCT No.: PCT/SE2010/050388
§ 371 (c)(1),
(2), (4) Date: Sep. 13, 2012

(87) PCT Pub. No.: WO2011/126417
PCT Pub. Date: Oct. 13, 2011

(65) Prior Publication Data
US 2013/0012259 A1  Jan. 10, 2013

(51) Int. Cl.
H04B 7/00 (2006.01)
H04W 52/24 (2009.01)
H04W 52/14 (2009.01)
H04W 52/10 (2009.01)

(52) U.S. Cl.
CPC .......... *H04W 52/244* (2013.01); *H04W 52/146* (2013.01); *H04W 52/10* (2013.01)

(58) Field of Classification Search
USPC .................................................. 370/315–320
See application file for complete search history.

(56) References Cited

U.S. PATENT DOCUMENTS

| 2008/0166976 A1* | 7/2008 | Rao ................................ 455/69 |
| 2008/0280638 A1 | 11/2008 | Malladi et al. |
| 2009/0290652 A1* | 11/2009 | Rezaiifar et al. ............. 375/260 |
| 2010/0093354 A1* | 4/2010 | Agashe et al. ............... 455/436 |
| 2010/0167780 A1* | 7/2010 | Lott et al. ..................... 455/522 |
| 2010/0279703 A1 | 11/2010 | Morita et al. |
| 2014/0036875 A1* | 2/2014 | Rezaiifar et al. ............. 370/332 |

FOREIGN PATENT DOCUMENTS

EP  2114020 A1  4/2009

OTHER PUBLICATIONS

Simonsson et al, "Uplink Power Control in LTE—Overview and Performance, Subtitle: Principles and Benefits of Utilizing rather than Compensating for SINR Variations" Vehicular Technology Conference, 2008. pp. 1-5, 21-24. Sep. 2008.
Muhammad et al., "Performance Evaluation of Uplink Closed Loop Power Control for LTE System," Vehicular Technology Conference. pp. 1-5, 20-23. Sep. 2009.
Fodor et al. "Near Optimum Power Control Under Fairness Constraints in CoMP Systems," Global Telecommunications Conference. pp. 1-8, Nov. 30, 2009-Dec. 4, 2009.

* cited by examiner

*Primary Examiner* — Fayyaz Alam

(57) ABSTRACT

A method in a wireless network containing a first node and an adjacent second node for determining an uplink received power target value of the second node to be used by a user equipment which is to be served by the second node includes establishing the uplink received power target value of the first node. The method also includes obtaining the downlink power capacity of the first node and obtaining the downlink power capacity of the second node. Additionally, the method includes calculating the difference in downlink power capacity between the first node and the second node and determining the uplink received power target value of the second node based on the calculated difference in downlink power capacity between the nodes and the established uplink received power target value of the first node.

15 Claims, 8 Drawing Sheets

METHOD AND ARRANGEMENT IN A WIRELESS NETWORK FOR DETERMINING AN UPLINK RECEIVED POWER TARGET VALUE

TECHNICAL FIELD

The present invention relates to a method and arrangement in a wireless network. In particular, it relates to a mechanism for determine an uplink received power target value of a second node, to be used by a user equipment which is to be served by the second node.

BACKGROUND

In heterogeneous networks with a mix of different cell sizes, typically different downlink power levels are used, which render different cell sizes. For example between macro sites and micro sites there can be 10-20 dB difference. There are a number of different nodes that are expected to be deployed with different downlink power levels such as e.g. macro base stations, micro base stations, pico base stations, femto base stations, relays and repeaters.

A macro base station may be referred to as a conventional base station that use dedicated backhaul and is open to public access. Typical transmit power may be e.g. ~43 dBm; antenna gain ~12-15 dBi.

A pica base station may be a low power base stations that use dedicated backhaul connections and is open to public access. Typical transmit power may range from ~23 dBm-30 dBm, 0-5 dBi antenna gain.

A femto base station may be a consumer-deployable base station that utilize consumer's broadband connection as backhaul; femto base stations may have restricted association. Typical transmit power may be less than 23 dBm.

Relays—base stations possibly use the same spectrum as backhaul and access. Typical transmit power may be of the same magnitude as pico base stations.

In the present context, the expression downlink is used for the transmission path from a base station such as e.g. an eNodeB, to the user equipment unit (UE). The expression uplink is used for the transmission path in the opposite direction i.e. from the user equipment to the base station.

Home eNodeB (HeNB or femto cells) are discussed in 3GPP for Long Term Evolution (LTE). A specific X2 interface is expected to be defined for this type of nodes, i.e. a communication interface between the base stations/eNodeBs/HeNB. X2 is the designated name of a standardized interface between two eNodeBs in E-UTRAN. The X2 can be seen as a logical connection between two eNodeBs over which user data and signaling messages are exchanged.

For uplink the power capability in the user equipment is independent of eNodeB type. In LTE downlink power is typically constant and uplink power is controlled with standardized open-loop power control. The target uplink received power is controlled with a parameter P0, the uplink received power target, which also may be referred to as the target received power. The target uplink received power P0 is the power level the base station desires the uplink signals from a user equipment to be received at.

LTE is designed for a 1-reuse resulting in a wideband Signal-to-Interference-Ratio (SIR) of 0 dB or less at the cell edges in a fully loaded network.

A cell selection and/or handover offset can be applied to increase the micro-cell coverage picking up all user equipments creating high interference in the smaller cell. One similar method is to base the cell selection on path loss instead of signal strength which is the same as an offset equal to the downlink power difference.

If the same target received power level is used in uplink, while downlink power differs between cells, there is an unbalance in received power levels between uplink and downlink when connected to a single site. It is further so that a user equipment connected to the macro base station, but close to the micro base station will generate an interference far exceeding the power of the desired signal in the micro base station. This results in a very low SIR. See further FIG. 1A and 1B. In FIG. 1A is downlink received power displayed, in FIG. 1B is uplink received power displayed.

Equal received power target (−90 dBm) in macro and micro base stations. Note that the SINR in the micro base station (MBS) is very low due to the interference from the user equipments (MS) connected to the macro base station (BS).

This may be mitigated by increasing the received power target in the micro base stations. This however leads to a very high interference in the macro base station, see FIG. 2A and 2B, wherein downlink and uplink received power, respectively, is illustrated. An increased received power target in the micro base station (−40 dBm) leads to very high interference in the macro base station.

One way of increasing the received power in the micro base stations is to artificially increase the noise level in these base stations, which may be referred to as desensitization. However, if the noise level is increased in the smaller cells there is a waste of good SIR. With a cell selection handover offset the downlink bitrate in the micro cell will be degraded.

SUMMARY

It is therefore an object of the present invention to provide a mechanism for improving the performance in a wireless network.

According to a first aspect of the present invention, the object is achieved by a method in a wireless network. The wireless network comprises a first node and an adjacent second node. The method aims at determining an uplink received power target value of the second node, to be used by a user equipment which is to be served by the second node. The downlink power capacity of the first node exceeds the downlink power capacity of the second node. The method comprises establishing the uplink received power target value of the first node. Also, the method comprises obtaining the downlink power capacity of the first node. Further, the method also comprises obtaining the downlink power capacity of the second node. In addition, the method further comprises calculating the difference in downlink power capacity between the first node and the second node. Additionally, furthermore, the method comprises determining the uplink received power target value of the second node, based on the calculated difference in downlink power capacity between the nodes and the established uplink received power target value of the first node.

According to a second aspect of the present invention, the object is achieved by an arrangement in a wireless network comprising a first node and an adjacent second node. The method aims at determining an uplink received power target value of the second node, to be used by a user equipment which is to be served by the second node. The downlink power capacity of the first node exceeds the downlink power capacity of the second node. The arrangement comprises an establishing unit. The establishing unit is configured to establish the uplink received power target value of the first node. The arrangement further comprises a first obtaining unit. The first obtaining unit is configured to obtain the downlink power capacity of the first node. Additionally, the arrangement comprises a second obtaining unit. The second obtaining unit is configured to obtain the downlink power capacity of the second node. Also, furthermore, the arrangement comprises a calculator. The calculator is configured to calculate the difference in downlink power capacity between the first node and the second node. Additionally, the arrangement also further comprises a determination unit. The determination unit is configured to determine the uplink received power target value of the second node, based on the calculated difference in downlink power capacity between the nodes and the established uplink received power target value of the first node.

Embodiments of the present method provide balanced uplink and downlink power levels for different cell sizes. Further, self configuration over a communication interface such as e.g. the X2 interface is provided. Thereby is a higher capacity in a Hierarchical Cell Structure (HCS) network provided. Thus the performance of the wireless network is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a wireless network node, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1A:
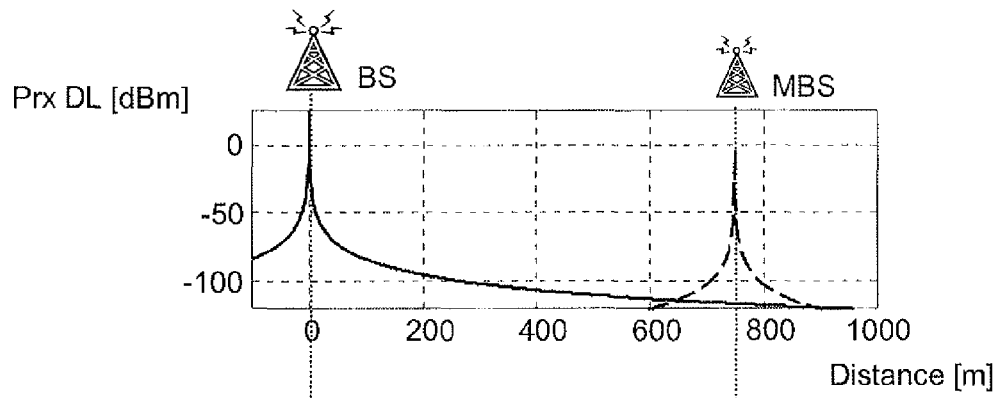
FIG. 1A is a schematic diagram illustrating downlink received power in a wireless network according to prior art.
Figure 1B:
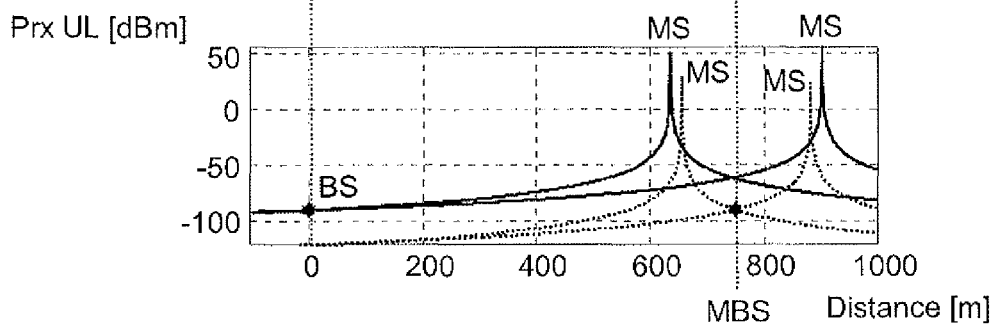
FIG. 1B is a schematic diagram illustrating uplink received power in a wireless network according to prior art.
Figure 2A:
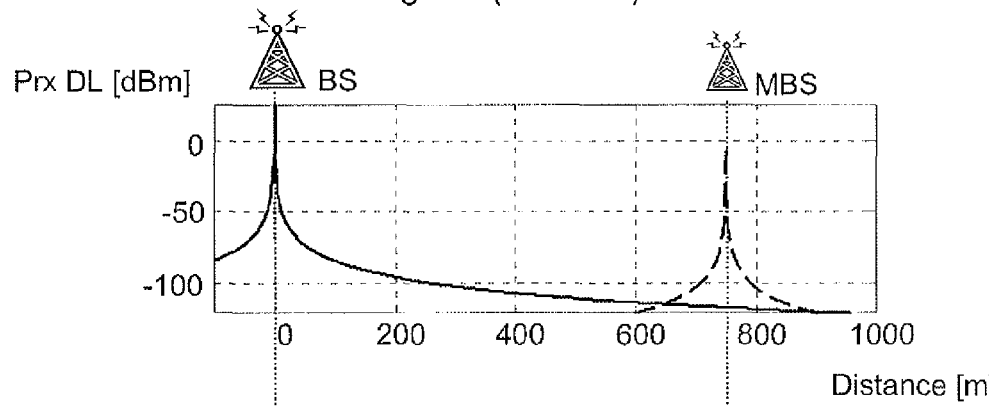
FIG. 2A is a schematic diagram illustrating downlink received power in a wireless network according to prior art.
Figure 2B:
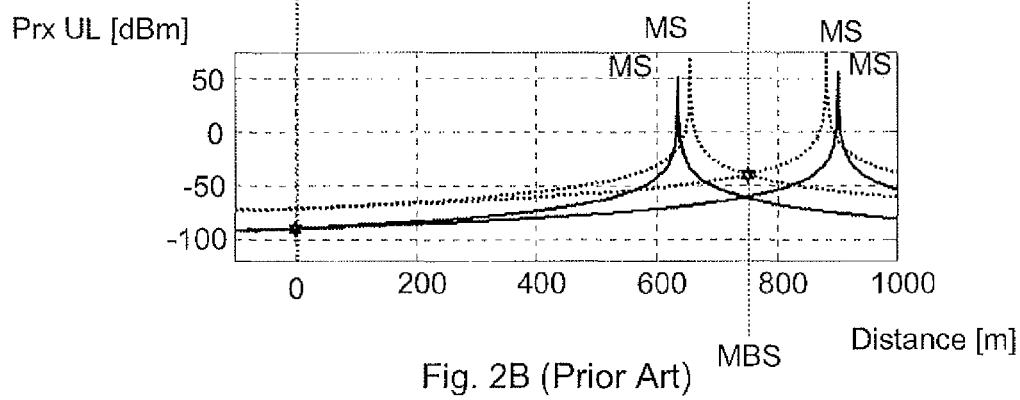
FIG. 2B is a schematic diagram illustrating uplink received power in a wireless network according to prior art.
Figure 3A:
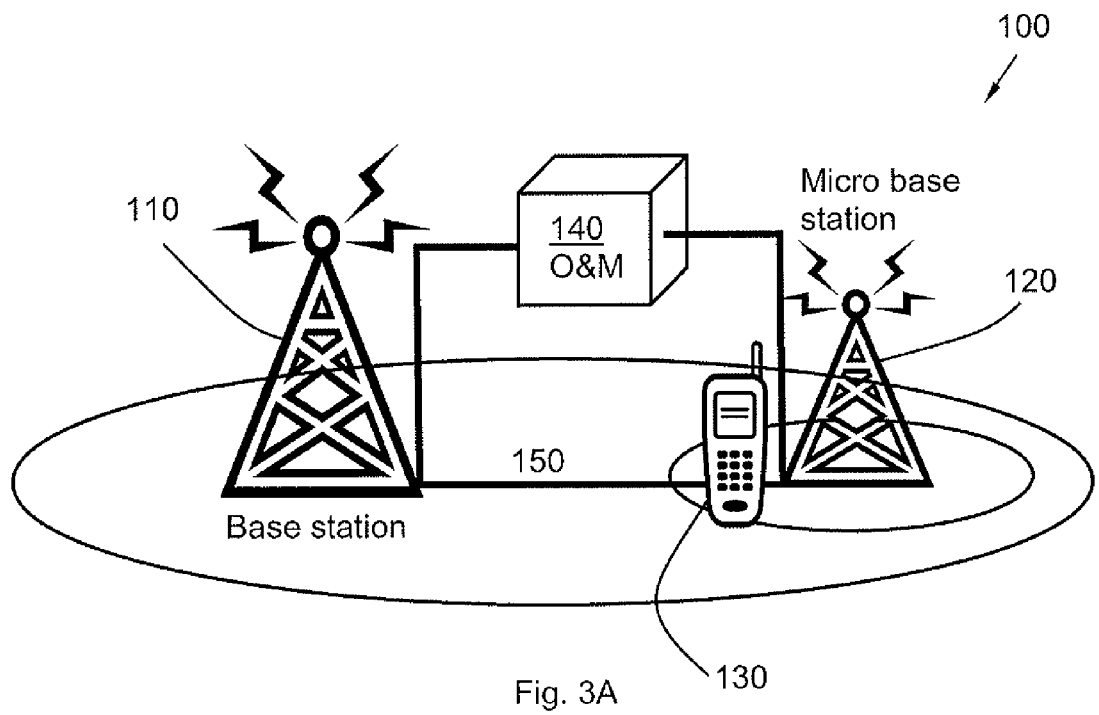
FIG. 3A is a schematic block diagram illustrating a wireless network according to some embodiments.

FIG. 3A depicts a wireless network 100, such as e.g. 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

In the following, the present methods and arrangements are further elaborated with specific reference to LTE networks in Frequency Division Duplex (FDD) mode and more particularly with respect to the uplink in LTE. Thus the wireless network 100 is described as an LTE system throughout the rest of the description, for enhanced comprehension and readability. However, it is obvious to a skilled person that corresponding concepts could also be applied in other wireless networks 100.

The wireless network 100 comprises a first node 110, a second node 120 and a user equipment 130, arranged to communicate with each other. The user equipment 130 is configured to transmit radio signals comprising information to be received by the first node 110 and/or the second node 120, depending e.g. on the geographical position of the user equipment 130 and/or load balancing between the nodes 110, 120, etc.

The downlink power capacity of the first node 110 exceeds the downlink power capacity of the second node 120. The first node 110 may be referred to as a macro base station and the second node 120 may be referred to as a micro base station, according to some embodiments.

Further, according to some embodiments a network node 140, e.g. an Operation & Management node (O&M) may be comprised in the wireless network 100.

The first node 110 and the second node 120 may communicate over an interface 150, which may be a backhaul network interface or an intra base station communication link interface such as e.g. an X2 interface.

The purpose of the illustration in FIG. 3A is to provide a general overview of the present methods and the functionalities involved.

The first node 110 may be referred to as e.g. a base station, a macro base station, a NodeB, an evolved Node B (eNB, or eNode B), a base transceiver station, Access Point Base Station, base station router, or any other network node configured for communication with the user equipment 130 over a wireless interface, depending e.g. of the radio access technology and terminology used. In the rest of the description, the term "first node" will be used for the first node 110, in order to facilitate the comprehension of the present methods and arrangements.

The second node 120 has a lower downlink power capacity than the first node 110. The second node 120 may be e.g. a base station, a macro base station, a NodeB, an evolved Node B (eNB, or eNode B), a base transceiver station, Access Point Base Station, base station router, or any other network node configured for communication with the user equipment 130 over a wireless interface, depending e.g. of the radio access technology and terminology used, with a lower downlink power capacity than the first node 110.

However, the second node 120 may further be referred to as a micro base station, pico base station, femto base station, Home eNodeB, relay and/or repeater. In the rest of the description, the term "second node" will be used for the second node 120, in order to facilitate the comprehension of the present methods and arrangements.

The user equipment 130 may be represented by e.g. a wireless communication terminal, a mobile station (MS), a mobile cellular phone, a Personal Digital Assistant (FDA), a wireless platform, a laptop, a computer or any other kind of device configured to communicate wirelessly with the first node 110 and/or the second node 120.

The optional network node 140 may control or provide support concerning the radio resource management within the network 100, such as e.g. providing management information to the first node 110 and/or the second node 120. Such information may be provided e.g. over an interface 150, which may be a backhaul network interface or an intra base station communication link interface such as e.g. an X2 interface.

According to some embodiments of the present method, the concerned base stations i.e. the first node 110 and/or the second node 120 set their uplink received power target (P0) based on downlink transmit power (PDL). The parameters PDL and P0 are communicated between base stations i.e. the first node 110 and/or the second node 120.

To balance the SIR in the first node 110, or macro base station, and the second node 120, or micro base station, the relationship between the uplink received power target (P0) and the downlink transmit power (PDL) may, according to some embodiments, be set differently. The uplink received power target (P0) may be set differently in different types of cells. A higher target may be used in smaller cells in proportion to the downlink power difference. For example, in the second node 120, a micro-cell with downlink power $P_{DLmicro}$ which is neighbour to the first node 110, a macro cell with downlink power $P_{DLmacrohd}$ and power control target $P0_{macro}$ the micro power control target $P0_{micro}$ may be set to (in scale):

$$P0\text{micro}=P0\text{macro}+PDL\text{ macro}-PDL\text{ micro} \quad \text{[Equation 1]}$$

Thus, according to some embodiments, the uplink received power target (P0) of the second node 120 is based on the difference in downlink power capacity between the first node 110 and the second node 120, and the uplink received power target value of the first node 110.

With this setting the SIR at full load may be around 0 in both uplink and downlink at the cell edge between the macro and the micro cell i.e. the cell of the first node 110 and the cell of the second node 120. No change of cell selection and handover criteria may be needed, as such decision of handover may be based on e.g. downlink Reference Signal Received Power (RSRP), Reference Signal Received Quality (RSRQ), Receive Signal Strength Indication (RSSI), or any similar value.

The presently described method is not applicable only on macro and micro cells but on any heterogeneous wireless network 100 with nodes 110, 120 with different power capability and downlink power levels. For example macro-cells, home eNodeBs, femto cells, pica cells, relays and/or repeaters.

The power target difference may be configured in several ways. According to some embodiments may the network node 140, i.e. a Operation & Management system node, configure the nodes 110, 120 within the network 100. This may be an advantage in particular when there is no X2 interface between nodes 110, 120, 140, such as may be the case for femto-cells according to some embodiments. It may further be preferable since it might be difficult for the micro/pico cell to make a distributed decision, depending on the network deployment. Such an embodiment is illustrated in FIG. 6A.

However, according to some embodiments may distributed decisions be made, where the micro/pico/femto decides individually based on neighbouring cells power. Information about neighbouring cell power and P0 may be acquired or broadcasted to all neighbour nodes 110, 120 via e.g. X2. The computation may be performed in the second node 120, as illustrated in FIG. 6B, or in the first node 110, as illustrated in FIG. 6C.

According to some embodiments may the user equipment 130 assist the presently described method by performing measurements. The user equipment 130 thus may perform measurements on neighbouring nodes 110, 120 and send a report to the second node 120, or even to the first node 110 according to some embodiments. P0 and downlink power may be broadcasted by the first node 110, and/or the second node 120, and can be measured by the user equipment 130.

Figure 6A:
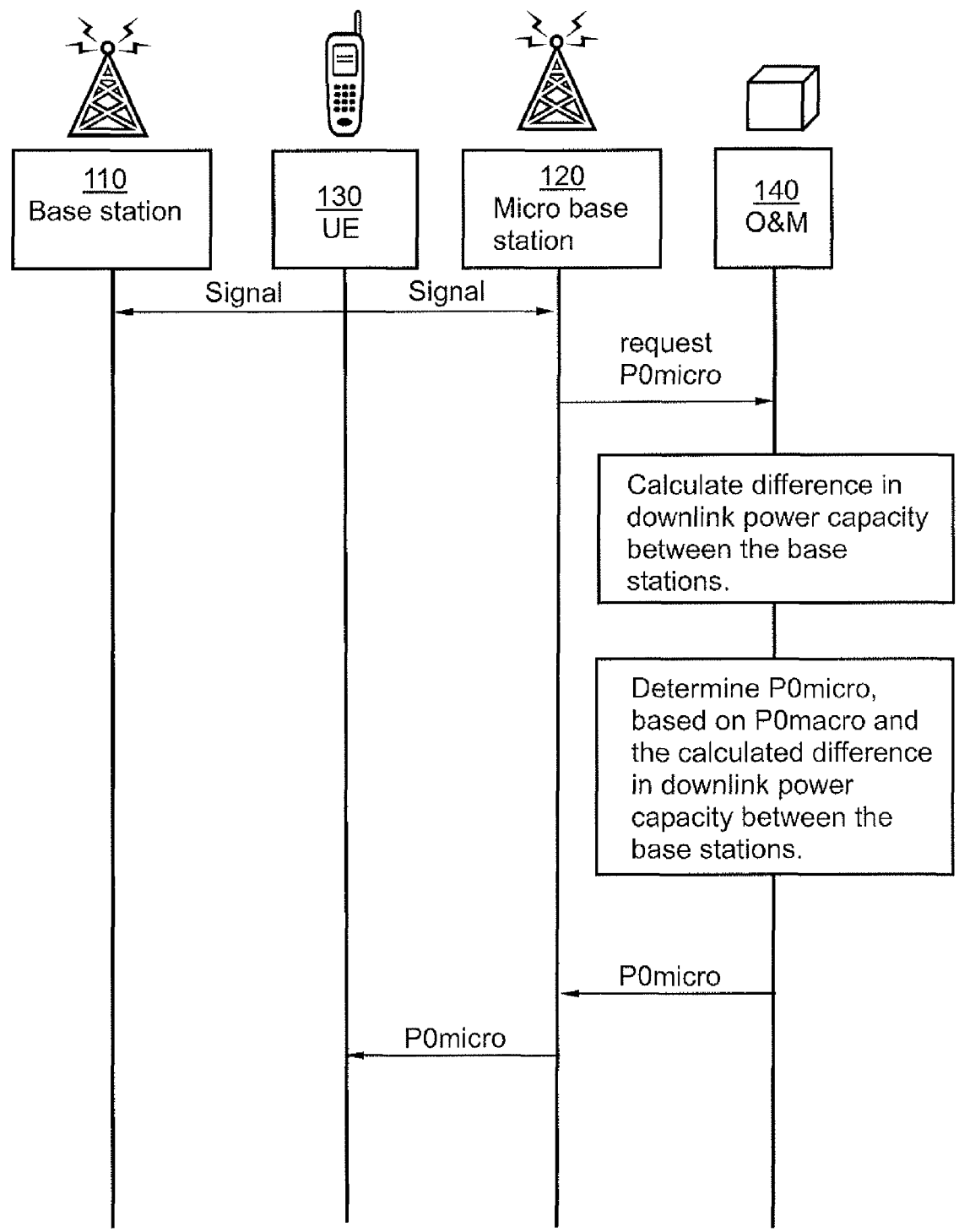
FIG. 6A is a combined flow chart and block diagram illustrating an embodiment of the present method.
Figure 6B:
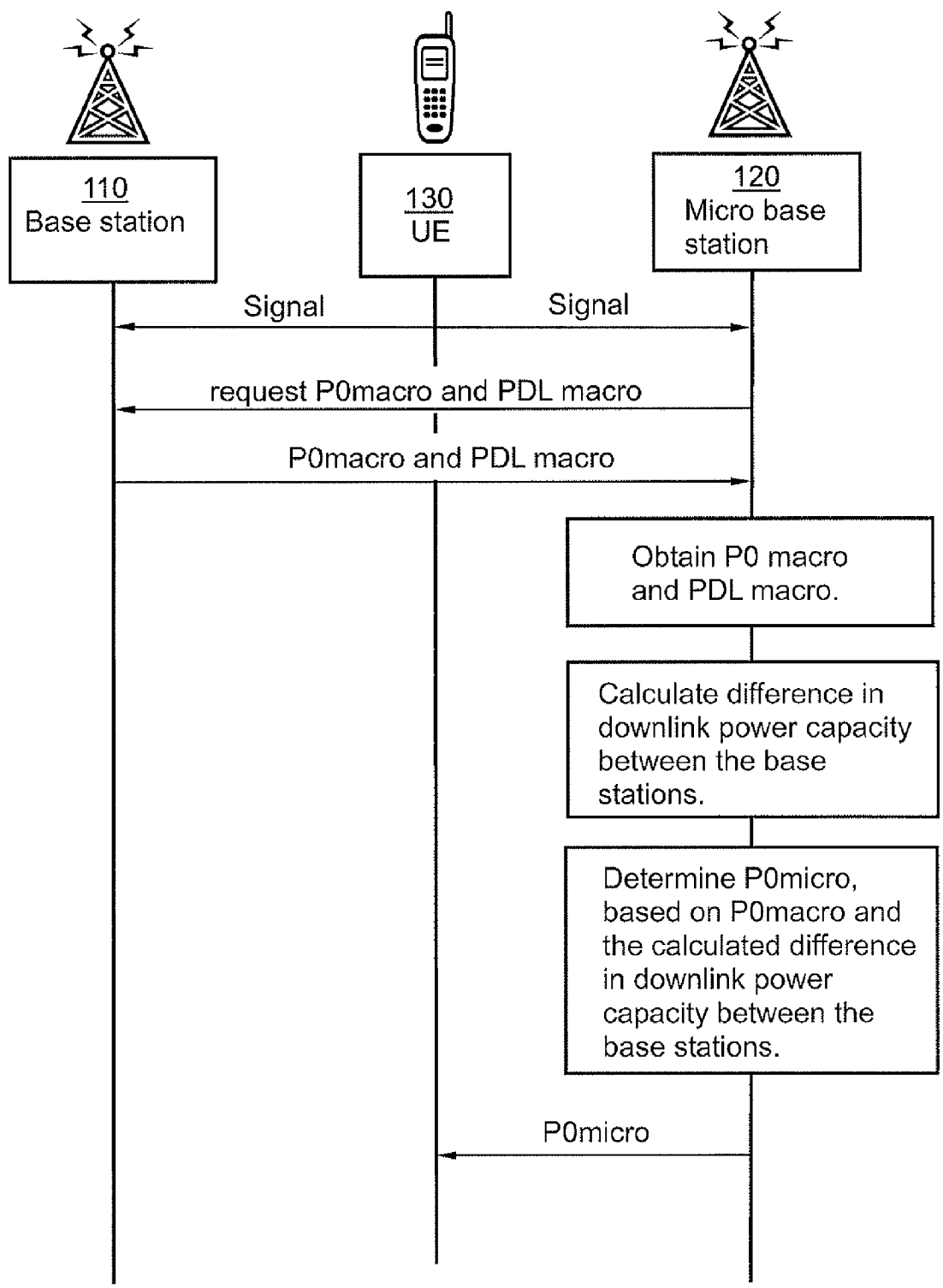
FIG. 6B is a combined flow chart and block diagram illustrating an embodiment of the present method.
Figure 6C:
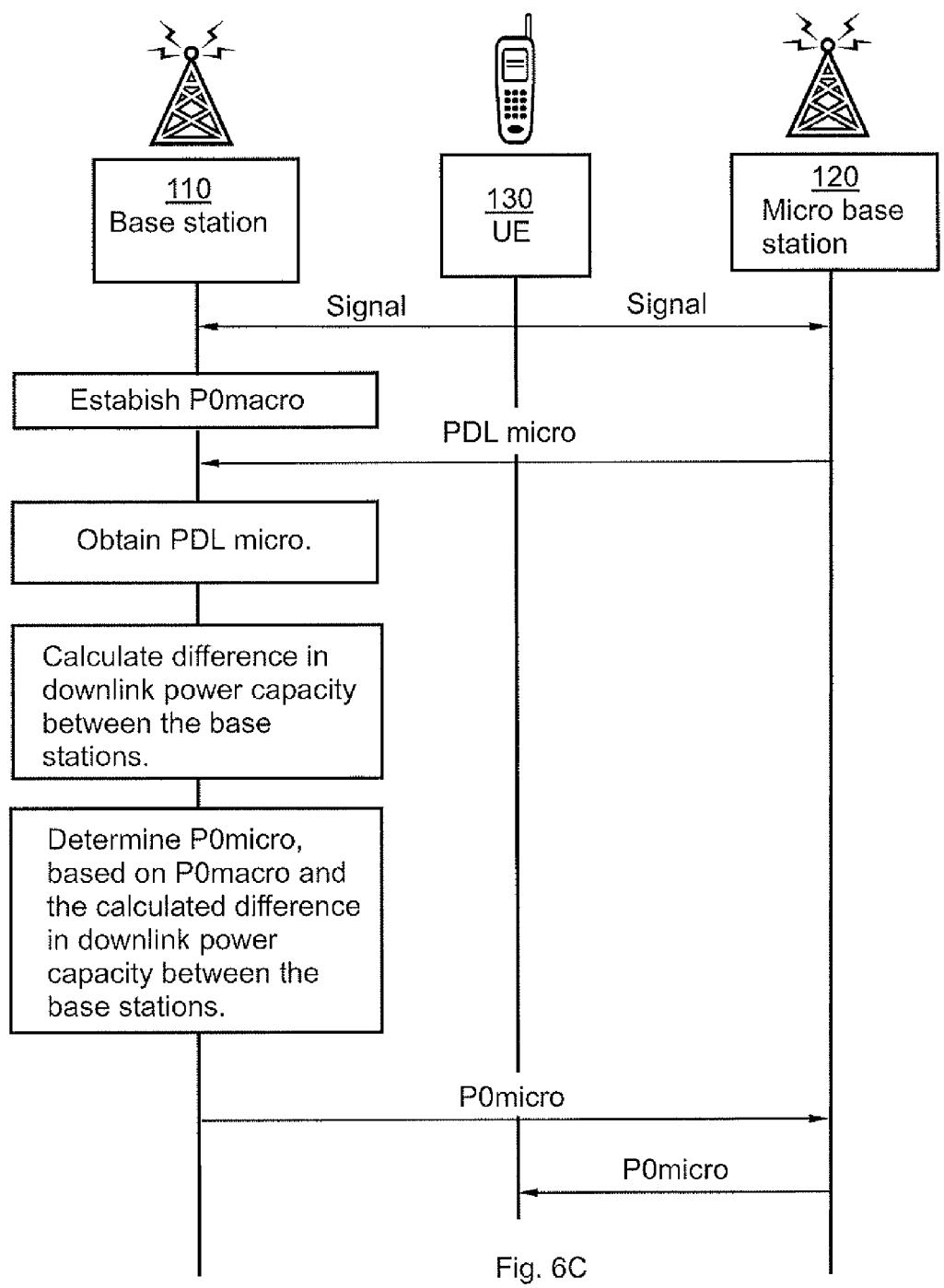
FIG. 6C is a combined flow chart and block diagram illustrating an embodiment of the present method.

It may be noted that the present method, or at least some method steps of the present method may be performed in the first node 110, in the second node 120 and/or in the optional network node 140, according to different embodiments, without departing from the present solution, as illustrated in FIGS. 6A-6C.

Figure 3B:
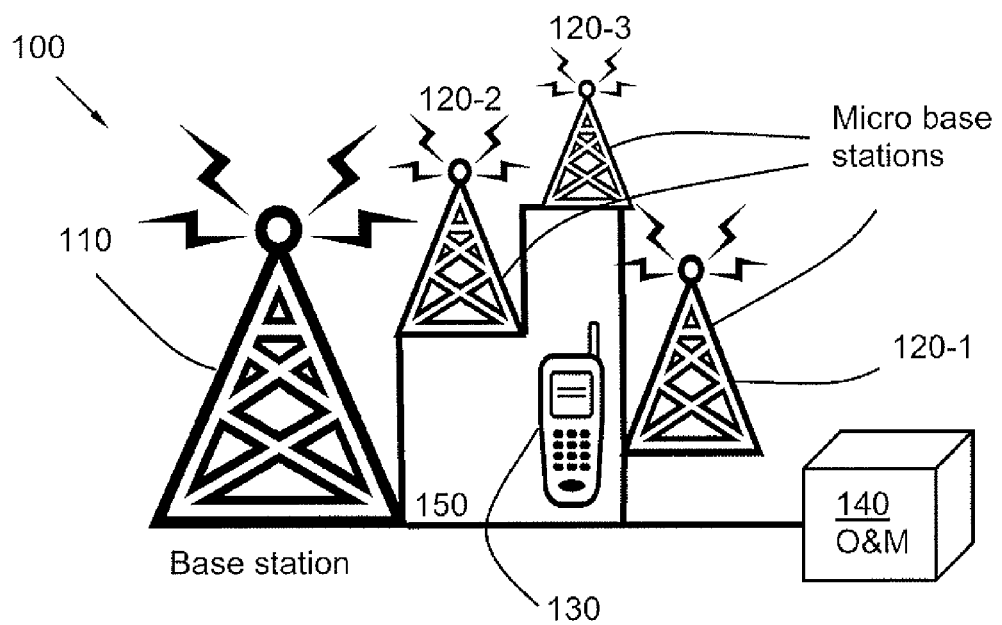
FIG. 3B is a schematic block diagram illustrating a wireless network according to some embodiments.

FIG. 3B depicts another embodiment of the wireless network 100, comprising a first node 110, or base station, and a plurality of adjacent micro base stations 120-1, 120-2, 120-3. Further a user equipment 130 configured to transmit radio signals to be received by the first node 110 and/or the adjacent nodes 120-1, 120-2, 120-3, depending e.g. on the geographical position of the user equipment 130 and/or load balancing between the nodes 110, 120-1, 120-2, 120-3, etc.

The downlink power capacity of the first node 110 exceeds the downlink power capacity of the adjacent nodes 120-1, 120-2, 120-3. The first node 110 may be referred to as a macro base station and the second node 120 may be referred to as a micro base station, pico base station, femto base station, Home eNodeB, relay, repeater or similar, according to some embodiments.

Further, according to some embodiments a network node 140, e.g. an Operation & Management node (O&M) may be comprised in the wireless network 100.

The first node 110 and the second node 120 may communicate over an interface 150, which may be an X2 interface.

30 To balance the SIR in the first node 110, or macro base station, and the second node 120, or micro base station, the relationship between the uplink received power target (P0) and the downlink transmit power (PDL) may, according to some embodiments, be set as follows (in dB scale):

$$P0\text{micro}=P0\text{macro}+\alpha \cdot (PDL\text{ macro}-PDL\text{ micro})+\epsilon \quad \text{[Equation 2]}$$

where $\alpha$ is a parameter denoting the fractional path loss compensation and $\epsilon$ is a compensational factor. The fractional path loss compensation α may be set to any value, e.g. to 1. However, to set α to a value less than 1 enables user equipment 130 situated close to the first node 110 and/or the second node 120 to signal on higher power than otherwise, as such user equipment 130 situated close to a base station 110, 120 i.e. in the middle section of a cell is likely to not disturb other base stations as the cell border is likely to be rather remote.

The compensational factor ε may be set to a value less than 0 in order to compensate for interference from the plurality of adjacent nodes 120-1, 120-2, 120-3. ε<0 may be seen as a macro friendly setting, as the resulting uplink received power target (P0) at the second node 120 (or adjacent nodes 120-1, 120-2, 120-3), i.e. P0 micro may thereby be reduced in comparison with the outcome if Equation 1 where used.

The compensational factor ε may also be set to a value bigger than 0, leading to an increased resulting uplink received power target (P0) at the second node 120, which may be seen as a micro base station friendly solution.

The compensational factor ε may also be set to 0, according to some embodiments.

However, according to some embodiments, the compensational factor ε may be based on the number of adjacent or neighbouring nodes 120-1, 120-2, 120-3.

More generally, according to some embodiments the SIR in the first node 110 (macro base station) and the second node 120 (micro base stations) may be given by:

SIR macro=Prx macro−Pi macro=P0 macro−(P0 micro+Pdl micro−Pdl macro)=P0 macro−P0 micro+(Pdl macro−Pdl micro)

SIR micro=Prx micro−Pi micro=P0 micro−(P0 macro+Pdl macro−Pdl micro)=P0 micro−P0 macro−(Pdl macro−Pdl micro)

Hence:
SIR macro−SIR micro=P0 macro−P0 micro+(Pdl macro−Pdl micro)−P0 micro+P0 macro+(Pdl macro−Pdl micro)=2× (P0 macro−P0 micro+(Pdl macro−Pdl micro)

This relationship allows setting the received power targets to control offsets between the macro and micro SIR.

Other power control parameters in addition to P0 may optionally be exchanged according to some embodiments and taken into account such as the fractional path loss compensation α. The uplink transmit power in e.g. LTE may be given by (closed loop terms excluded):

$$Ptx = P0 + \alpha \cdot PL$$

Hence, with α≠1, the SIR in macro and micro base stations is given by:

SIR macro=Prx macro−Pi macro=
=Ptx macro−PL macro−(Ptx micro−PL macro)=
=P0 macro+α·PL macro−(P0 micro+α·PL micro)=
=P0 macro−P0 micro+α·(PL macro−PL micro)=
={at cell border: PL macro−PL micro=Pdl macro−Pdl micro}=
=P0 macro−P0 micro+α·(Pdl macro−Pdl micro)

SIR micro=Prx micro−Pi micro=
=Ptx micro−PL micro−(Ptx macro−PL micro)=
=P0 micro+α·PL micro−(P0 macro+α·PL macro)=
=P0 micro−P0 macro+α·(PL micro−PL macro)=
={at cell border: PL macro−PL micro=Pdl macro−Pdl micro}=
=P0 micro−P0 macro+α·(Pdl micro−Pdl macro)

To balance these, i.e. get SIR macro=SIR micro,
P0 macro−P0 micro+α·(Pdl macro−Pdl micro)=P0 micro−P0 macro+α·(Pdl micro−Pdl macro)→P0 micro−P0 macro=α·(Pdl macro−Pdl micro)

It may be noted that this assumes the same value of α in macro and micro cells. There are possible deployment scenarios where full balancing may not be the best solutions.

The downlink power difference can partly be taken into account according to some embodiments.

Statistical relations between cells can be taken into account, compensating mostly to major neighbour cells while neighbours with only a small amount of interfering sample on can be ignored or only partly compensated, according to some embodiments.

Figure 4A:
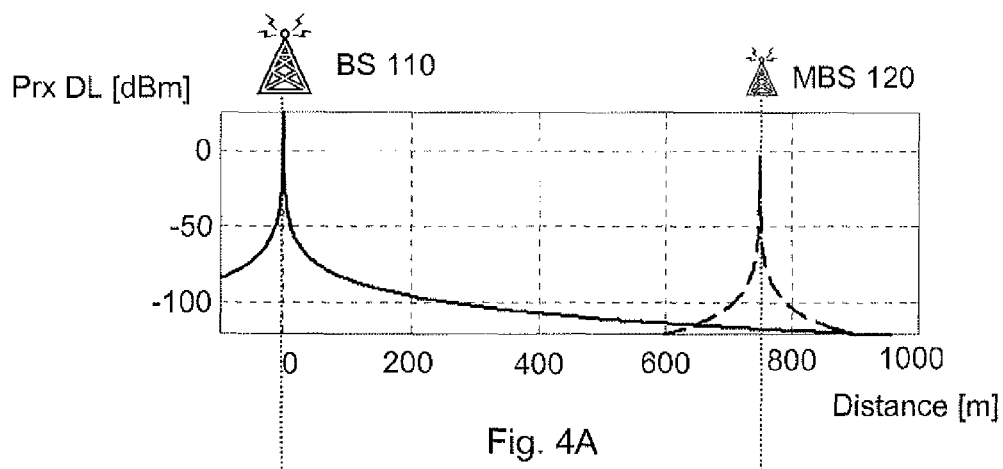
FIG. 4A is a schematic diagram illustrating downlink received power in a wireless network according to some embodiments of the present method.
Figure 4B:
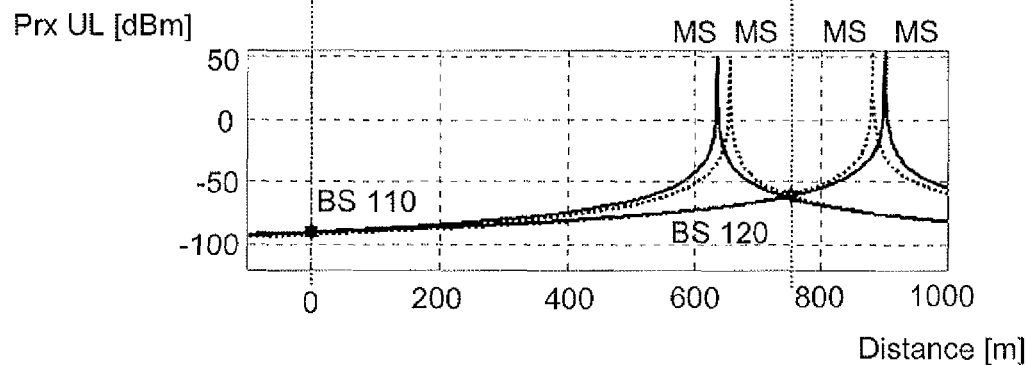
FIG. 4B is a schematic diagram illustrating uplink received power in a wireless network according to some embodiments of the present method.

FIG. 4A and FIG. 4B are a schematic diagrams illustrating downlink and uplink received power respectively in a wireless network 100 according to embodiments of the present method.

The effect of the present method is illustrated in FIG. 4A and FIG. 4B for a case with two nodes 110, 120. This leads to a balanced SIR in the first node 110 and the second node 120. Note that despite the worst case interference situation, i.e. mobiles at cell-border, the desired signals are stronger than the interfering signals in the illustrated diagrams.

Figure 5A:
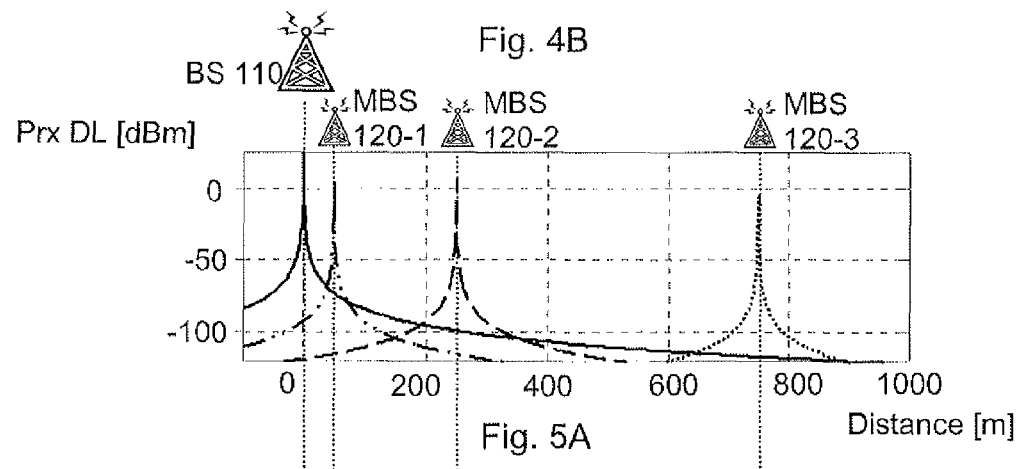
FIG. 5A is a schematic diagram illustrating downlink received power in a wireless network according to some embodiments of the present method.
Figure 5B:
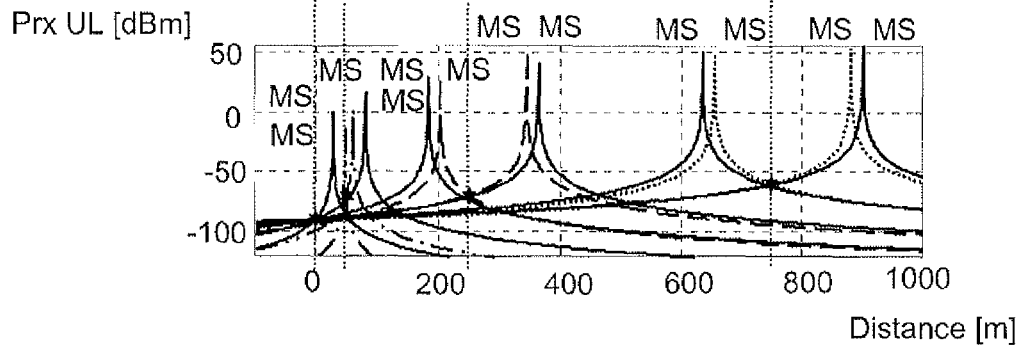
FIG. 5B is a schematic diagram illustrating uplink received power in a wireless network according to some embodiments of the present method.

FIG. 5A and FIG. 5B are a schematic diagrams illustrating downlink and uplink received power respectively in a wireless network 100 according to embodiments of the present method.

The effect of the present method is illustrated in FIG. 5A and FIG. 5B for a case with one first node 110, or base station and three smaller adjacent nodes 120-1, 120-2, 120-3, or micro base stations. This leads to a balanced SIR in the first node 110 and the three smaller adjacent nodes 120-1, 120-2, 120-3. Note that also here, despite the worst case interference situation, i.e. user equipment 130 at cell-border, the desired signals are stronger than the interfering signals in the illustrated diagrams.

FIG. 6A is a combined flow chart and block diagram illustrating an embodiment of the present method. An embodiment of signaling performed between the first node 110, the second node 120, the user equipment 130 and the network node 140 is illustrated in FIG. 6A. However, it is to be understood that although only one second node 120 is illustrated in FIG. 6A, for clarity reasons, a plurality of adjacent nodes 120-1, 120-2, 120-3 may be involved in the present method, as already discussed in the description of FIG. 3B. Thus whenever one second node 120 is referred to in the subsequent description, a plurality of nodes 120-1, 120-2, 120-3 may be involved.

An exemplary embodiment of the present method will now be described in a number of method steps. It is to be noted that the method steps according to some embodiments may be performed in another sequential order than the order of presentation indicates. Also, it may be noted that some of the described method steps are optional and only comprised within some embodiments.

In a first method step, the user equipment 130 may transmit a signal to be received by the first node 110 and/or the second node 120. The signal may comprise information data bits representing different binary values, which binary values in turn represent, or is to be interpreted as, any information.

The network node 140 may determine the uplink received power target of the second node 120 (P0 micro). This may be performed after having received a request for P0 micro from the second node 120, or otherwise at any appropriate moment in time.

The second node 120 may e.g. when receiving the signal from the user equipment 130, may send a request for the uplink received power target of the second node 120 (P0 micro), to the network node 140.

The network node 140 may communicate with the first node 110 and/or the second node 120 by means of a wireless broadcast, a wireless dedicated transmission, or by using an intra base station interface 150, such as X2, according to different embodiments.

The network node 140, which may be an Operation and Management node, have immediate access to the uplink received power target of the first node 110 (P0 macro), the downlink transmit power of the first node 110 (PDL macro), the downlink transmit power of the second node 120 (PDL micro) and possibly also other parameters that may be appropriate for computing the uplink received power target of the second node 120 (P0 micro). These values may be predetermined and e.g. stored in a memory device or similar at the network node 140, or on a memory device directly accessible for the network node 140.

Thereafter, when having obtained the downlink transmit power of the first node 110 and the downlink transmit power of the second node 120, the difference in downlink transmit power capacity between the first node 110 and the second node 120 is calculated. The calculation may be performed by subtracting the obtained downlink power capacity of the second node 120 from the downlink power capacity of the first node 110, according to some embodiments.

Thus the uplink received power target value of the second node 120 is determined, based on the calculated difference in downlink power capacity between the first node 110 and the second node 120, and the established uplink received power target value of the first node 110. The previously discussed equation 1 may be used according to some embodiments. However, alternatively may equation 2 be used, with the fractional path loss compensation a and/or the compensational factor $\epsilon$ set to appropriate values, e.g. by the network node 140.

The determined uplink received power target value of the second node 120 (P0 micro) may then be sent to the second node 120, e.g. by a wireless broadcast, a wireless dedicated transmission, or by using an intra base station interface 150, such as X2.

The second node 120 may in turn transmit the P0 micro value to the user equipment 130, according to some embodiments. This value may then used by the user equipment 130 in order to adjust the signaling power of the user equipment 130 to an appropriate level, i.e. such that signals transmitted by the user equipment 130 are received by the second node 120 at the determined uplink received power target value of the second node 120 (P0 micro).

FIG. 6B is a combined flow chart and block diagram illustrating an embodiment of the present method. An embodiment of signaling performed between the first node 110, the second node 120 and the user equipment 130 is illustrated in FIG. 6B. However, it is to be understood that although only one second node 120 is illustrated in FIG. 6B, for clarity reasons, a plurality of adjacent nodes 120-1, 120-2, 120-3 may be involved in the present method, as already discussed in the description of FIG. 3B. Thus whenever one second node 120 is referred to in the subsequent description, a plurality of nodes 120-1, 120-2, 120-3 may be involved according to some embodiments.

An exemplary embodiment of the present method will now be described in a number of method steps. It is to be noted that the method steps according to some embodiments may be performed in another sequential order than the order of presentation indicates. Also, it may be noted that some of the described method steps are optional and only comprised within some embodiments.

In a first method step, the user equipment 130 may transmit a signal to be received by the first node 110 and/or the second node 120. The signal may comprise information data bits representing different binary values, which binary values in turn represent, or is to be interpreted as, any information.

The second node 120 may e.g. when receiving the signal from the user equipment 130, or otherwise, determine to compute the uplink received power target of the second node 120 (P0 micro). In order to do that, the uplink received power target of the first node 110 (P0 macro) and the downlink transmit power of the first node 110 (PDL macro) may be obtained, e.g. by sending a request for these values to the first node 110, or to e.g. the network node 140 that has access to these values.

The first node 110 may according to some embodiments reply to the request by sending the downlink transmit power of the first node 110 (PDL macro) and the uplink received power target of the first node 110 (P0 macro) to the second node 120. The transmission may optionally be performed over a wireless broadcast, a wireless dedicated transmission, or by using an intra base station interface 150, such as X2, according to different embodiments.

Thereafter, when having obtained the downlink transmit power of the first node 110 and also obtained the downlink transmit power of the second node 120, the difference in downlink transmit power capacity between the first node 110 and the second node 120 is calculated. The calculation may be performed by subtracting the obtained downlink power capacity of the second node 120 from the downlink power capacity of the first node 110, according to some embodiments.

Thus the uplink received power target value of the second node 120 is determined, based on the calculated difference in downlink power capacity between the first node 110 and the second node 120, and the obtained uplink received power target value of the first node 110. The previously discussed equation 1 may be used according to some embodiments. However, alternatively may equation 2 be used, with the fractional path loss compensation a and/or the compensational factor s set to appropriate values, e.g. by the second node 120.

The determined uplink received power target value of the second node 120 (P0 micro) may then be sent to the user equipment 130, according to some embodiments. This value may then be used by the user equipment 130 in order to adjust the signaling power of the user equipment 130 to an appropriate level, i.e. such that signals transmitted by the user equipment 130 are received by the second node 120 at the determined uplink received power target value of the second node 120 (P0 micro).

FIG. 6C is a combined flow chart and block diagram illustrating an embodiment of the present method. An embodiment of signaling performed between the first node 110, the second node 120 and the user equipment 130 is illustrated in FIG. 6C. However, it is to be understood that although only one second node 120 is illustrated in FIG. 6C, for clarity reasons, a plurality of adjacent nodes 120-1, 120-2, 120-3 may be involved in the present method, as already discussed in the description of FIG. 3B. Thus whenever one second node 120 is referred to in the subsequent description, a plurality of nodes 120-1, 20 120-2, 120-3 may be involved.

An exemplary embodiment of the present method will now be described in a number of method steps. It is to be noted that the method steps according to some embodiments may be performed in another sequential order than the order of presentation indicates. Also, it may be noted that some of the described method steps are optional and only comprised within some embodiments.

In a first method step, the user equipment 130 may transmit a signal to be received by the first node 110 and/or the second node 120. The signal may comprise information data bits representing different binary values, which binary values in turn represent, or is to be interpreted as, any information.

The first node 110 may e.g. when receiving the signal from the user equipment 130, or when receiving a request for P0 micro from the second node 120, or at any otherwise convenient moment, determine the uplink received power target of the second node 120 (P0 micro).

The first node 110 establishes the uplink received power target of the first node 110 (P0 macro). This value may be predetermined and e.g. stored in a memory device or similar at the first node 110, or on a memory device directly accessible for the first node 110.

Further, the first node 110 obtains the downlink transmit power of the second node 120 (PDL micro). The downlink transmit power of the second node 120 may be obtained from the second node 120, e.g. after the first node having sent a request for the downlink transmit power of the second node 120, to the second node 120. It may be obtained by means of a wireless broadcast, a wireless dedicated transmission, or by using an intra base station interface 150, such as X2, according to different embodiments.

Thereafter, when having obtained the downlink transmit power of the first node 110 and the downlink transmit power of the second node 120, the difference in downlink transmit power capacity between the first node 110 and the second node 120 is calculated. The calculation may be performed by subtracting the obtained downlink power capacity of the second node 120 from the downlink power capacity of the first node 110, according to some embodiments.

Thus the uplink received power target value of the second node 120 is determined, based on the calculated difference in downlink power capacity between the first node 110 and the second node 120, and the established uplink received power target value of the first node 110. The previously discussed equation 1 may be used according to some embodiments. However, alternatively may equation 2 be used, with the fractional path loss compensation a and/or the compensational factor ϵ set to appropriate values, e.g. by the first node 110.

The determined uplink received power target value of the second node 120 (P0 micro) may then be sent to the second node 120, e.g. by a wireless broadcast, a wireless dedicated transmission, or by using an intra base station interface 150, such as X2.

The second node 120 may in turn transmit the P0 micro value to the user equipment 130, according to some embodiments. This value may then used by the user equipment 130 in order to adjust the signaling power of the user equipment 130 to an appropriate level, i.e. such that signals transmitted by the user equipment 130 are received by the second node 120 at the determined uplink received power target value of the second node 120 (P0 micro).

Figure 7:
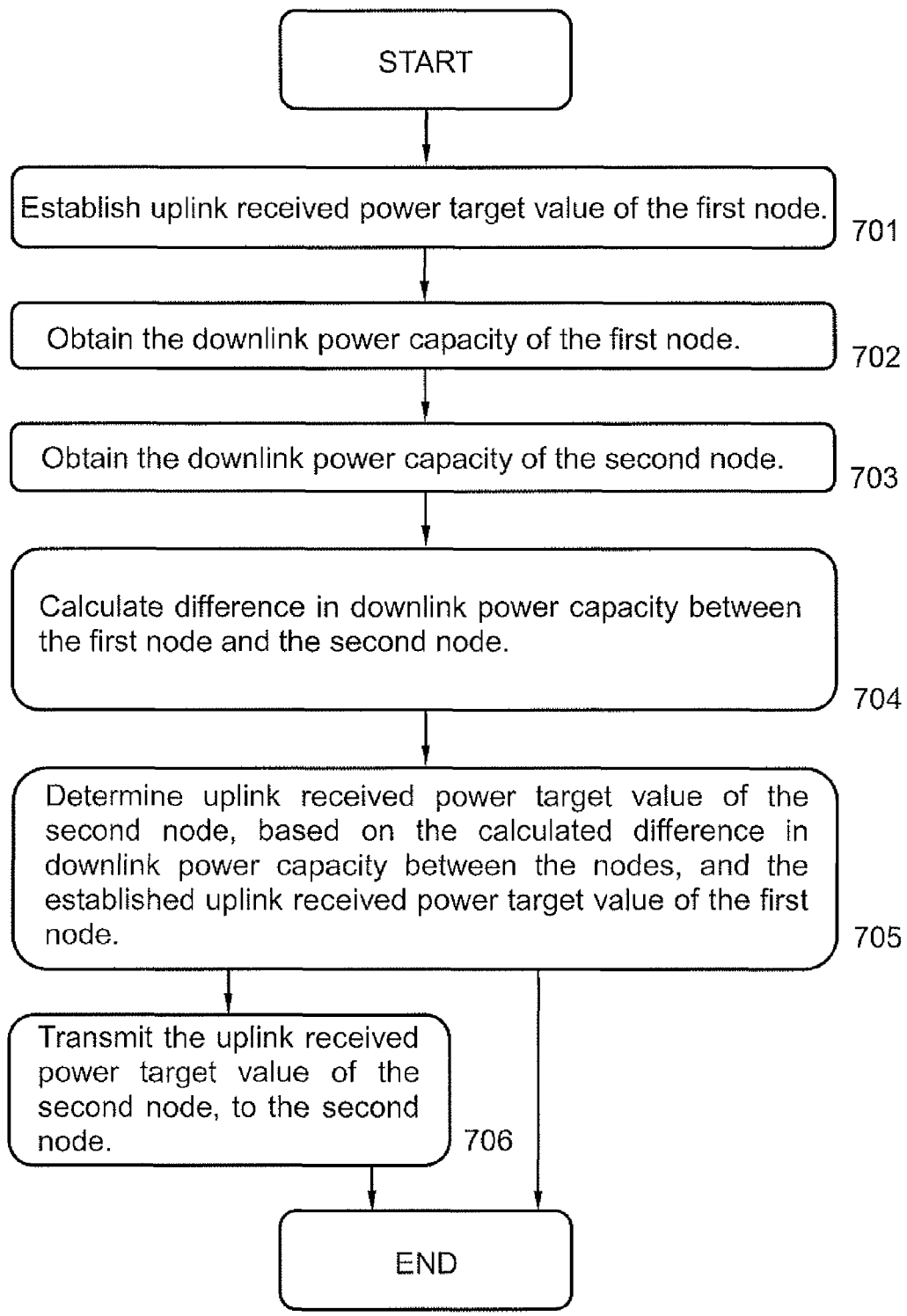
FIG. 7 is a flow chart illustrating embodiments of the present method.

FIG. 7 is a flow chart illustrating embodiments of method steps 701-706 performed in a wireless network 100 comprising a first node 110 and an adjacent second node 120. The method steps 701-706 aims at determining an uplink received power target value of the second node 120, to be used by a user equipment 130 which is to be served by the second node 120. The downlink power capacity of the first node 110 exceeds the downlink power capacity of the second node 120. According to some embodiments may the uplink received power target value of the second node 120 is determined based on the difference in downlink power capacity of a plurality of adjacent nodes 120-1, 120-2, 120-3 within the wireless network 100. The wireless network 100 may be e.g. a LTE radio network. The user equipment 130 may be e.g. a mobile telephone.

The method may according to some embodiments only be performed if the signal interference between the first node 110 and the second node 120 exceeds a predetermined threshold value.

The first node 110 may be a base station e.g. an evolved node B, eNB, according to some embodiments. The second node 120, or nodes 120-1, 120-2, 120-3 may be a micro base station, pico base station, femto base station, Home eNodeB, relay, repeater or similar, according to some embodiments.

The method may be performed in a network node 140 comprised within the wireless network 100. The network node 140 may have access to the uplink received power target value of the first node 110, the downlink power capacity of the first node 110 and the downlink power capacity of the second node 120. The network node 140 may optionally be an Operation & Management node (O&M), comprised in the wireless network 100.

To appropriately determining the uplink received power target value of the second node 120, the method may comprise a number of method steps 701-706.

It is however to be noted that some of the described method steps, e.g. step 706, are optional and only comprised within some embodiments. Further, it is to be noted that the method steps 701-706 may be performed in a somewhat different chronological order and that some of them, e.g. step 701 and 702, may be performed simultaneously or in a rearranged chronological order. The method may comprise the following steps:

Step 701

The uplink received power target value of the first node 110 is established.

According to some embodiments, wherein the method is performed in the second node 120, may the step of establishing the uplink received power target value of the first node 110, optionally comprise receiving the uplink received power target value of the first node 110 over a communication interface 150 from the first node 110. The communication interface 150 may be an inter base station communication interface e.g. X2.

According to some embodiments, wherein the method is performed in the second node 120, may the step of establishing the uplink received power target value of the first node 110, optionally comprise obtaining the uplink received power target value of the first node 110 from a broadcast made by the first node 110 over a communication interface 150.

According to some embodiments, wherein the method is performed in the second node 120, may the step of establishing the uplink received power target value of the first node 110, comprise obtaining the uplink received power target value of the first node 110 from the user equipment 130.

According to some embodiments, wherein the method is performed in the second node 120, may the step of establishing the uplink received power target value of the first node 110, comprise obtaining the uplink received power target value of the first node 110 from the network node 140. The network node 140 may have access to the uplink received power target value of the first node 110, the downlink power capacity of the first node 110 and the downlink power capacity of the second node 120, according to some embodiments.

Step 702

The downlink power capacity of the first node 110 is obtained.

According to some embodiments, wherein the method is performed in the second node 120, may the step of obtaining the downlink power capacity of the first node 110, optionally comprise receiving the downlink power capacity of the first node 110 over a communication interface 150 from the first node 110. The communication interface 150 may be an inter base station communication interface such as e.g. X2.

According to some embodiments, wherein the method is performed in the second node 120, may the step of obtaining the downlink power capacity of the first node 110, optionally comprise obtaining the downlink power capacity of the first node 110 from a broadcast made by the first node 110 over a communication interface 150.

According to some embodiments, wherein the method is performed in the second node 120, may the step of obtaining the downlink power capacity of the first node 110, comprise obtaining the downlink power capacity of the first node 110 from the user equipment 130.

According to some embodiments, wherein the method is performed in the second node 120, may the step of obtaining the downlink power capacity of the first node 110, comprise obtaining the downlink power capacity of the first node 110 respectively from the network node 140. The network node 140 may have access to the uplink received power target value of the first node 110, the downlink power capacity of the first node 110 and the downlink power capacity of the second node 120, according to some embodiments.

Step 703

The downlink power capacity of the second node 120 is obtained.

According to some embodiments, wherein the method is performed in the first node 110 may the step of obtaining the downlink power capacity of the second node 120 comprise receiving the downlink power capacity of the second node 120 from the second node 120, in embodiments where the method is performed in the first node 110.

Step 704

The difference in downlink power capacity between the first node 110 and the second node 120 is calculated.

The difference in downlink power capacity between the first node 110 and the second node 120 may according to some embodiments comprise subtracting the obtained downlink power capacity of the second node 120 from the downlink power capacity of the first node 110. This may require that the downlink power values are given in decibels (dBm). In linear terms it would be the ratio of the downlink powers that may be calculated and not a subtraction of the linear power values.

Step 705

The uplink received power target value of the second node 120 is determined, based on the calculated difference in downlink power capacity between the nodes 110, 120 and the established uplink received power target value of the first node 110.

The step of determining the uplink received power target value of the user equipment 130 may according to some embodiments comprise adding the calculated difference in downlink power capacity between the nodes 110, 120, to the established uplink received power target value of the first node 110.

However, the step of determining the uplink received power target value of the user equipment 130 may further, according to some embodiments be based on a compensational factor $\epsilon$, which may be predetermined to a value less than 0 if the signal quality at the first node 110 is to be prioritised and the compensational factor $\epsilon$ may be predetermined to a value equal to or exceeding 0 if the signal quality at the second node 120 is to be prioritised.

The uplink received power target value of the user equipment 130 may according to some embodiments be determined based on a compensational factor $\epsilon$, which may be a function of the number of nodes 120-1, 120-2, 120-3 adjacent to the first node 110.

The step of determining 705 the uplink received power target value of the second node 120, may further be based on a fractional path loss compensation value $\alpha$, according to some embodiments.

Step 706

This step is optional and may only be performed within some embodiments.

The determined uplink received power target value of the second node 120 may be transmitted to the second node 120 according to some embodiments.

According to some embodiments may the method be performed in the first node 110, and the determined uplink received power target value of the second node 120 may be transmitted to the second node 120 over the communication interface 150.

Figure 8:
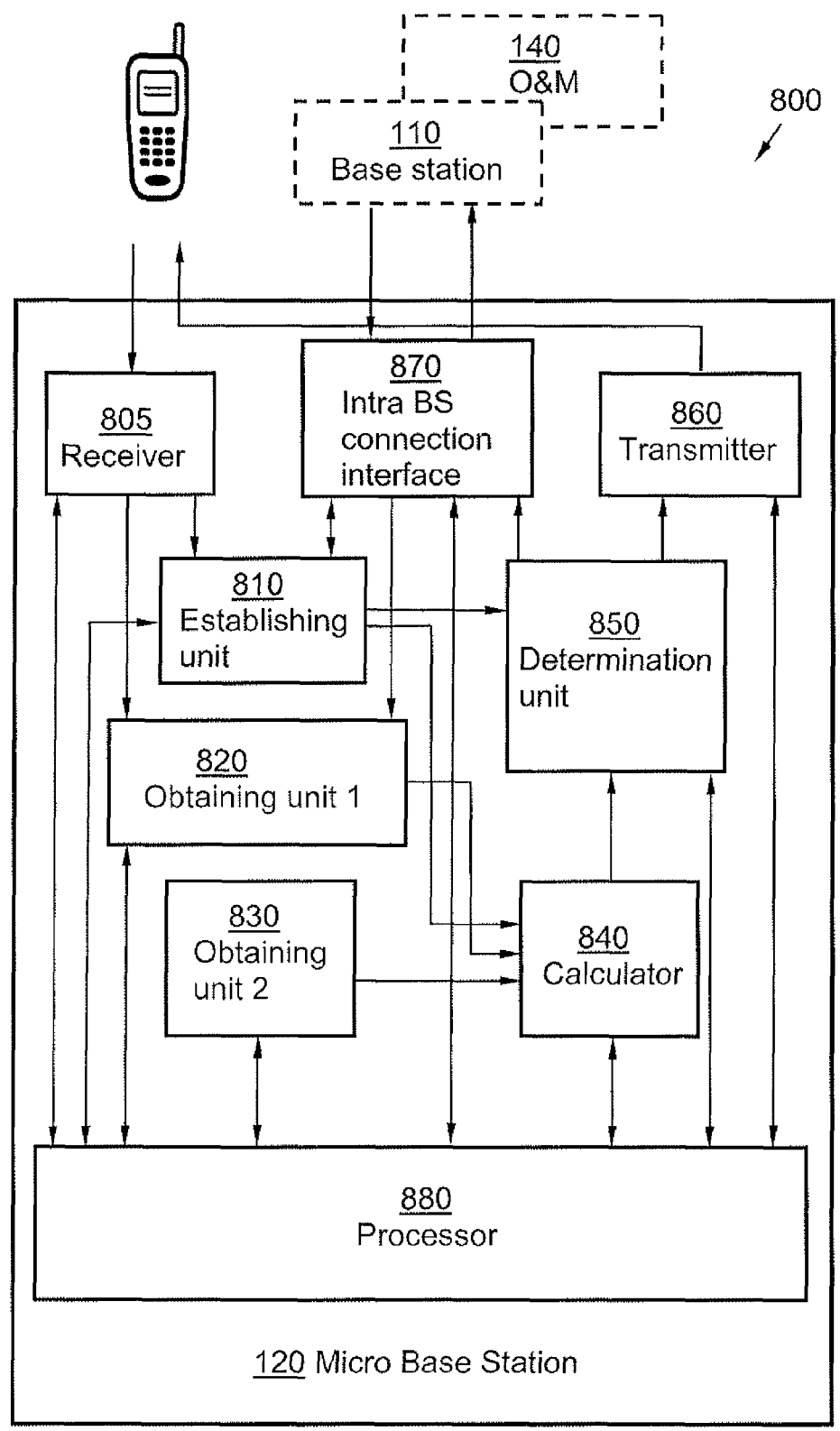
FIG. 8 is a schematic block diagram illustrating an arrangement according to some embodiments.

FIG. 8 schematically illustrates an arrangement 800 in a wireless network 100. The wireless network 100 comprises a first node 110 and an adjacent second node 120. The arrangement 800 is adapted to perform any, some or all of the method steps 701-706 in order to determine an uplink received power target value of the second node 120, to be used by a user equipment 130 which is to be served by the second node 120.

The method steps 701-706 aims at determining an uplink received power target value of the second node 120, to be used by a user equipment 130 which is to be served by the second node 120. The downlink power capacity of the first node 110 exceeds the downlink power capacity of the second node 120. According to some embodiments may the uplink received power target value of the second node 120 is determined based on the difference in downlink power capacity of a plurality of adjacent nodes 120-1, 120-2, 120-3 within the wireless network 100. The wireless network 100 may be e.g. a LTE radio network. The user equipment 130 may be e.g. a mobile telephone.

The first node 110 may be a base station e.g. an evolved node B, eNB, according to some embodiments. The second node 120, or nodes 120-1, 120-2, 120-3 may be a micro base station, pica base station, femto base station, Home eNodeB, relay, repeater or similar, according to some embodiments.

The method may according to some embodiments be performed in a network node 140 comprised within the wireless network 100. The network node 140 may have access to the uplink received power target value of the first node 110, the downlink power capacity of the first node 110 and the downlink power capacity of the second node 120. The network node 140 may optionally be an Operation & Management node (O&M), comprised in the wireless network 100.

In order to perform the method steps 701-706 correctly, the arrangement 800 comprises e.g. an establishing unit 810. The establishing unit 810 is configured to establish the uplink received power target value of the first node 110. Also, the arrangement 800 further comprises, in addition, a first obtaining unit 820. The first obtaining unit 820 is configured to obtain the downlink power capacity of the first node 110. Further, the arrangement 800 in addition also comprises a second obtaining unit 830. The second obtaining unit 830 is configured to obtain the downlink power capacity of the second node 120. The arrangement 800 further also comprises a calculator 840. The calculator 840 is configured to calculate the difference in downlink power capacity between the first node 110 and the second node 120. Additionally, the arrangement 800 also, furthermore comprises a determination unit 850. The determination unit 850 is configured to determine the uplink received power target value of the second node 120, based on the calculated difference in downlink power capacity between the nodes 110, 120 and the established uplink received power target value of the first node 110.

Further, according to some embodiments, the arrangement 800 may comprise a transmitter 860. The transmitter 860 may be configured to transmit the determined uplink received power target value of the second node 120 over a communication interface 150.

Also, the arrangement 800 further may comprise a receiver 805. The receiver 805 may be configured to receive signals over a radio interface, according to some embodiments.

Furthermore, the arrangement 800 may additionally comprise an intra base station connection interface 870, according to some embodiments. The intra base station connection interface 870 may be configured to receive and/or transmit signals to and/or from other nodes 110, 120, 140 within the wireless network 100.

In addition, the arrangement 800 may comprise a processor 880. The processor 880 may be configured to process the received information data by applying an algorithm.

The processor 880 may be represented by e.g. a Central Processing Unit (CPU), a microprocessor, or other processing logic that may interpret and execute instructions. The processor 880 may perform all data processing functions for inputting, outputting, and processing of data including data buffering and device control functions, such as call processing control, user interface control, or the like.

It is to be noted that any internal electronics of the arrangement 800, not completely necessary for understanding the present method according to the method steps 701-706 has been omitted from FIG. 8, for clarity reasons.

Further, it is to be noted that some of the described units 810-880 comprised within the arrangement 800 in the node 110, 120, 140 in the wireless network 100 are to be regarded as separate logical entities but not with necessity separate physical entities. To mention just one example, the receiving unit 805 and the transmitter 860 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first node 110, and/or the second node 120 and the user equipment 130 may comprise both traffic and control signals e.g. paging signals/ messages for incoming calls, which may be used to establish and maintain a voice call communication with another party or to transmit and/or receive data, such as SMS, e-mail or MMS messages, with a remote user equipment.

The method steps 701-706 in the node 110, 120, 140 may be implemented through one or more processors 880 in the arrangement 800, together with computer program code for performing the functions of the present method steps 701-706. Thus a computer program product, comprising instructions for performing the method steps 701-706 in the arrangement 800 may determine an uplink received power target value of the second node 120, to be used by a user equipment 130 which is to be served by the second node 120, when the computer program product is loaded into the processor 880.

The computer program product mentioned above may be provided for instance in the form of a data carrier carrying computer program code for performing the method steps according to the present solution when being loaded into the processor unit 880. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the node 110, 120, 140 remotely, e.g. over an Internet or an intranet connection.

Further, a computer program product comprising instructions for performing at least some of the method steps 701-706 may be used for implementing the previously described method in the network node 110, 120, 140 for determine an uplink received power target value of the second node 120, to be used by a user equipment 130 which is to be served by the second node 120, when the computer program product is run on a processor 880 comprised within the arrangement 800.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

Further by means of example and in order to simplify the comprehension, the term SIR has been consistently used in this text when describing a Signal-to-Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal-to-Noise Ratio (SNR), Signal to Noise Ratio (S/N), Signal to Noise and Interference Ratio (SNIR), Signal to Interference and Noise Ratio (SINR) or an inversion of the ratio, like Interference to Signal Ratio, (ISR). Any of these or similar ratios may be used in the context of this description instead of the SIR.

The invention claimed is:

1. A method in a wireless network, comprising a first node and an adjacent second node, for determining an uplink received power target value of the second node, to be used by a user equipment which is to be served by the second node, the downlink power capacity of the first node exceeds the downlink power capacity of the second node, the method comprising the steps of:

establishing the uplink received power target value of the first node;

obtaining the downlink power capacity of the first node;

obtaining the downlink power capacity of the second node;

calculating the difference in downlink power capacity between the node and the second node; and determining the uplink received power target value of the second node, based on the calculated difference in downlink power capacity between the nodes and the established uplink received power target value of the first node.

2. The method according to claim 1 wherein:

calculating the difference in downlink power capacity between the first node and the second node comprises subtracting the obtained downlink power capacity of the second node from the downlink power capacity of the first node, and wherein:

determining the uplink received power target value of the user equipment comprises adding the calculated difference in downlink power capacity between the nodes to and the established uplink received power target value of the first node.

3. The method according to claim 1, wherein:
determining the uplink received power target value of the user equipment is further based on a compensational factor $\epsilon$, which is predetermined to a value less than 0 if the signal quality at the first node is to be prioritised and the compensational factor $\epsilon$ is predetermined to a value equal to or exceeding 0 if the signal quality at the second node is to be prioritised.

4. The method according to claim 1, wherein:
determining the uplink received power target value of the user equipment is further based on a compensational factor $\epsilon$, which is a function of the number of nodes adjacent to the first node.

5. The method according to claim 1, wherein:
determining the uplink received power target value of the second node, is further based on a fractional path loss compensation value $\alpha$.

6. The method according to claim 1, wherein the method is only performed if the signal interference between the first node and the second node exceeds a predetermined threshold value.

7. The method according to claim 1, wherein the uplink received power target value of the second node is determined based on the difference in downlink power capacity of a plurality of adjacent nodes within the wireless network.

8. The method according to claim 1, wherein the method is performed in a network node comprised within the wireless network wherein the network node has access to the uplink received power target value of the first node, the downlink power capacity of the first node and the downlink power capacity of the second node, and wherein the method further comprises transmitting the determined uplink received power target value of the second node to the second node.

9. The method according to claim 1, wherein the method is performed in the second node, and wherein establishing the uplink received power target value of the first node and obtaining the downlink power capacity of the first node respectively comprises receiving the uplink received power target value of the first node and the downlink power capacity of the first node respectively over a communication interface from the first node.

10. The method according to claim 1, wherein the method is performed in the second node, and wherein establishing the uplink received power target value of the first node and obtaining the downlink power capacity of the first node respectively comprises obtaining the uplink received power target value of the first node and the downlink power capacity of the first node respectively from a broadcast made by the first node over a communication interface.

11. The method according to claim 1, wherein the method is performed in the second node, and wherein establishing the uplink received power target value of the first node and obtaining the downlink power capacity of the first node respectively comprises obtaining the uplink received power target value of the first node and the downlink power capacity of the first node respectively from the user equipment.

12. The method according to claim 1, wherein the method is performed in the second node, and wherein establishing the uplink received power target value of the first node and obtaining the downlink power capacity of the first node respectively comprises obtaining the uplink received power target value of the first node and the downlink power capacity of the first node respectively from a network node comprised within the wireless network wherein the network node has access to the uplink received power target value of the first node, the downlink power capacity of the first node and the downlink power capacity of the second node.

13. The method according to claim 1, wherein the method is performed in the first node, and wherein obtaining the downlink power capacity of the second node comprises receiving the downlink power capacity of the second node from the second node, and wherein the method further comprises transmitting the determined uplink received power target value of the second node to the second node over a communication interface.

14. An apparatus for use in a wireless network, comprising a first node and an adjacent second node, for determining an uplink received power target value of the second node, to be used by a user equipment which is to be served by the second node, the downlink power capacity of the first node (110) exceeds the downlink power capacity of the second node, the apparatus comprising:
an establishing unit configured to establish the uplink received power target value of the first node;
a first obtaining unit configured to obtain the downlink power capacity of the first node;
a second obtaining unit configured to obtain the downlink power capacity of the second node;
a calculator configured to calculate the difference in downlink power capacity between the first node and the second node; and
a determination unit configured to determine the uplink received power target value of the second node based on the calculated difference in downlink power capacity between the nodes and the established uplink received power target value of the first node.

15. The apparatus according to claim 14, further comprising a transmitter configured to transmit the determined uplink received power target value of the second node over a communication interface.

* * * * *